(12) United States Patent
Hesse et al.

(10) Patent No.: US 6,568,703 B2
(45) Date of Patent: May 27, 2003

(54) INTERFERENCE FIT ATTACHMENT FOR A ROUNDED MEMBER

(75) Inventors: William O. Hesse, Aurora, CO (US); Raymond John Klein, Englewood, CO (US); Michael Abdella, Littleton, CO (US); Mark Woodward, Littleton, CO (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/870,572

(22) Filed: May 30, 2001

(65) Prior Publication Data

US 2002/0180186 A1 Dec. 5, 2002

(51) Int. Cl.⁷ .............................................. B60R 21/26
(52) U.S. Cl. .................... 280/728.2; 403/193; 403/199; 403/282; 29/520
(58) Field of Search ....................... 280/728.2; 403/189, 403/192, 193, 199, 368, 369, 371, 282, 284; 29/520; 285/139.1, 142.1

(56) References Cited

U.S. PATENT DOCUMENTS

| | | | | |
|---|---|---|---|---|
| 1,219,978 A | * | 3/1917 | Masters | 403/369 |
| 1,442,944 A | * | 1/1923 | Harvey | 403/371 |
| 2,925,977 A | * | 2/1960 | Cononi | 403/199 |
| 3,024,300 A | * | 3/1962 | Martin | 403/282 |
| 4,482,174 A | * | 11/1984 | Puri | 29/520 |
| 4,597,687 A | * | 7/1986 | Colas | 29/520 |
| 4,734,265 A | | 3/1988 | Nilsson et al. | |
| 4,925,140 A | * | 5/1990 | Camarota | 403/199 |
| 5,356,175 A | * | 10/1994 | Rose et al. | 280/728.2 |
| 5,445,408 A | * | 8/1995 | Mossi | 280/728.2 |
| 5,482,316 A | | 1/1996 | Lang et al. | |
| 5,498,029 A | * | 3/1996 | Mossi et al. | 280/728.2 |
| 5,553,886 A | * | 9/1996 | Gunn et al. | 280/728.2 |
| 5,592,729 A | | 1/1997 | Dyer et al. | |
| 5,645,298 A | | 7/1997 | Stevens et al. | |
| 5,918,898 A | * | 7/1999 | Wallner et al. | 280/728.2 |
| 6,010,153 A | | 1/2000 | Halas et al. | |

* cited by examiner

*Primary Examiner*—Peter C. English
(74) *Attorney, Agent, or Firm*—Sally J. Brown; James D. Erickson

(57) ABSTRACT

A novel apparatus and method for attaching a rounded member, such as an inflator assembly for an automobile air bag, to another member or surface, particularly a flat surface, is disclosed. A spacer, which may take the form of a split ring, is positioned around an attachment surface of the rounded member. Then, while the spacer is supported against further motion along the inflator, a flange having a shank with a tapered inside diameter may be passed around the inflator and spacer. As the inside diameter of the flange narrows to contact the spacer, the flange exerts inward pressure tending to frictionally engage the inflator with the spacer, and the spacer with the flange. Thus, an interference fit having a high retention strength may be comparatively easily and rapidly formed. The spacer may be hardened so as to indent the inflator and/or the flange to enhance the retention strength of the assembly. The spacer may be reconfigured in a number of ways to provide the appropriate combination of resistance against axial pressure and torsion.

26 Claims, 4 Drawing Sheets

INTERFERENCE FIT ATTACHMENT FOR A ROUNDED MEMBER

BACKGROUND OF THE INVENTION

1. The Field of the Invention

The present invention relates to systems and methods for attaching two or more members together. More specifically, the present invention relates to a novel system and method for securely and easily mounting a rounded member, for example, an airbag inflator, to an interior surface of a vehicle.

2. The Relevant Technology

Many methods are currently available for fastening two or more parts together as part of an assembly. Flat parts, such as steel beams, struts, and the like can typically be comparatively easily fastened together through the use of fasteners, adhesives, welding, or a similar method. Adjoining flat surfaces provide an even, simple interface for the attachment.

However, rounded members, such as bars, pipes, pressure vessels, and the like present greater attachment problems. Round, convex surfaces often require the use of a corresponding concave surface to provide an attachment interface. Thus, many implements, such as conventional clamps and the like, that are useful for attaching two flat parts together, cannot be used for rounded parts.

The attachment problem is further multiplied when the rounded member is subject to high stress. In the case of pressure vessels, for example, a comparatively thin wall is subject to high stress from a pressurized internal fluid. The walls of such vessels are typically manufactured to have a uniform thickness and a comparatively uniform curvature so that stresses are evenly distributed throughout the wall. Thus, significant deformation or piercing of the wall is to be avoided. Holes, in particular, are problematic even if they do not extend fully through the wall of the pressure vessel, because stresses tend to concentrate at holes. As a result, cracks often begin forming at holes, and propagate outward from the hole. Although thinner wall sections are not as critical as holes, they are also often failure points because of stress concentration.

As a result, the number of methods that can be used to attach a rounded member under considerable stress to another member is very limited. Fasteners that require holes, such as screws, bolts, rivets, and the like, are clearly undesirable. Welding also has a tendency to weaken the underlying material, and requires that the joint to be welded be accessible to the welding equipment.

Conventional press fitting, or "interference" fitting, is an attachment process by which a member is attached to another member or a fixture by friction. "Frictional engagement" refers to two surfaces that are pressed together such that friction keeps them from sliding relative to each other. "Interference" refers to a geometric state in which one part blocks motion of another part; in an interference fit, one or both parts are deflected to make the relative motion possible.

In order to provide an interference fit, a protrusion in one member is typically inserted into a cavity in another, and the cavity is dimensioned slightly smaller than the protrusion. The cavity must then be stretched, and the protrusion compressed, in order to fit together. A considerable amount of radial pressure between the protrusion and the cavity results, so that the protrusion is held within the cavity by frictional force. Often, the protrusion, the cavity, or both may be tapered so that the protrusion can be gradually forced into the cavity.

The force required to force the protrusion into the cavity is generally proportional to the force required to withdraw it. In order to create an attachment that will withstand a desired axial (along the axis of symmetry of the rounded member) tension, a commensurate degree of compression may need to be applied to insert the protrusion into the cavity. However, in circumstances in which torsion, or rotational force, is to be coupled with the tension, a lower amount of tension may be required to withdraw the protrusion.

One such application in which it is desirable to rigidly mount a rounded member is for automotive safety restraint devices. The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield. Side impact airbags have also been developed in response to the need for similar protection from impacts in a lateral direction, or against the side of the vehicle.

The explosive charge is typically located in an inflator, which often takes the form of a cylindrical metal pressure vessel designed to contain the explosion and channel the resulting gases into the airbag. Since the inflator contains explosive materials, it is very important that it be firmly fastened to an interior surface of the vehicle. The inflator typically has a cylindrical central portion with roughly hemispherical end caps. Thus, the problems described above in connection with attachment of rounded members generally, apply to inflators. Additionally, Department of Transportation regulations restrict the use of any welded joints in motor vehicles. Generally, attachments in motor vehicles, particularly attachments related to safety systems, must be strong enough to withstand the operating vibrations of the vehicle as well as potential impacts.

Furthermore, known attachments are typically not adaptable to inflators of different sizes. Airbag sizes may vary from one vehicle to the next; consequently, an airbag manufacturer may need to be able to make and install several different inflator sizes. With most known attachment systems, each inflator size would require its own specially-sized attachment. The need to pair each size with an associated attachment assembly has increased the time and expense required for inflator installation.

Consequently, it would be an advancement in the art to provide a method and apparatus for attaching a rounded member to another member without welding. More specifically, it would be an advancement in the art to enable the attachment of a rounded member such as an inflator to a comparatively flat surface such as a vehicle surface.

The method and apparatus should preferably be easily carried out with a minimum of equipment. Thus, the method and apparatus should preferably provide a comparatively large holding force with a comparatively small attachment force. Preferably, the method and apparatus should be capable of maintaining attachment even under combined axial and torsional loads. The method and apparatus should also be usable to attach rounded members with a wide range of sizes, without the need to design and use different attachment hardware with each size. Furthermore, the method and apparatus should be simple and inexpensive to implement.

BRIEF SUMMARY OF THE INVENTION

The apparatus of the present invention has been developed in response to the present state of the art, and in particular, in response to the problems and needs in the art that have not yet been fully solved by currently available systems and methods for attaching rounded members. Consequently, the present invention provides a novel system and method for attaching a rounded member, particularly to a flat surface. Although the following disclosure provides the example of an airbag inflator, the method and system disclosed herein may be used with any rounded member.

An inflator attachment may comprise an inflator, a flange, and a spacer. The inflator typically takes the form of a cylindrical pressure vessel with roughly hemispherical ends. The inflator is located within a suitable compartment of a vehicle, such as a passenger side dashboard compartment. The inflator provides pressurized gas to an airbag, either through a conduit, or through direct passage of air into an opening of the airbag from an opening, or diffuser, positioned in a first end of the inflator. The inflator may be attached to a vehicle surface within the compartment at a second end of the inflator, so as to maintain the inflator in a cantilevered, suspended position within the compartment.

In the alternative to the cantilevered configuration, the first end of the inflator may be attached in similar fashion to a bolt. Thus, the diffuser may have threads sized to engage an opening of the vehicle surface, or a nut used in combination with an opening to secure the first end. Other attachment methods such as crimping may also be used to secure the first end. If desired, the airbag can then be folded into the compartment with the opening of the airbag facing the inflator.

Either form of attachment may be facilitated by attaching the flange to the second end of the inflator. In the case of a cantilevered attachment, the second end of the inflator may actually be attached to a vehicle surface through the use of the flange. If the first end is attached, the flange may simply be used as a shoulder to maintain the second end properly positioned with respect to the first, and to support the inflator against axial and torsional forces that may be applied during installation.

Preferably, the flange has a shank and a web. The shank has a tubular configuration large enough to fit with clearance around the inflator. The web may then comprise a perpendicular, disc-like extension with a flat mounting surface that can be mated to the vehicle surface within the compartment. The web may be affixed to the vehicle surface through fastening, adhesive or chemical bonding, welding, or any other suitable method.

The spacer may comprise a compressible, split-ring design that can slide relatively easily over the inflator in its uncompressed configuration. The spacer is positioned between the inflator and the flange, and is preferably dimensioned so as to be compressed between the spacer and the inflator. If desired, the spacer may be constructed of a material harder than the inflator and/or the flange, so as to create indentations in the inflator and/or flange during assembly. The indentations then serve to keep the spacer in position with respect to the inflator and the flange. The edges of the spacer are effectively held by interference within the indentations so that no axial motion of the spacer is possible. If desired, the spacer may be formed with indentations or other shaped features to increase the amount of interference and thereby increase the resistance of the interference fit to axial force.

In addition, to the extent that the spacer comprises any radial irregularities, such as gaps (as in a split ring), protrusions, or the like, the indentation is shaped accordingly. Thus, the interference of the indentation with the radial irregularities effectively precludes rotation of the ring in response to torsional forces acting on the inflator during installation of the inflator or operation of the vehicle. In order to enhance resistance against torsional force, the spacer may have a configuration different from a split ring. For example, a series of curved blocks, separate or connected by ring sections, may be utilized. Alternatively, ridges parallel to the axis of symmetry of the spacer may be formed on the inside and/or the outside of the spacer.

In addition to the enhanced resistance to axial and torsional force, the present invention provides a number of distinct assembly advantages. Notably, in certain embodiments, a comparatively small assembly force may be used, even though the force required to remove the flange from the inflator remains large.

Initially, the spacer may be slid into position around a circumferential portion of the second end of the inflator. A tubular support designed to fit around the inflator with clearance, and within the flange with clearance, may then be positioned in abutting relation to the ring. The flange is preferably constructed with a tapered inside diameter, in which a larger portion is sized to fit over the spacer with clearance, and a smaller portion is small enough to interfere with the spacer, while still fitting over the inflator with clearance. The larger portion may be positioned proximate the web.

The flange may thus be slid over the inflator, with the web and the larger portion of the tapered inside diameter leading, from the first end of the inflator toward the second end. The larger portion of the tapered inside diameter slides over the spacer, and the smaller portion of the tapered inside diameter comes into contact with the spacer. The support and inflator may then be held firmly in place while the flange is forced further toward the second end of the inflator. The narrowing inside diameter of the flange effectively forces the spacer inward, so that the spacer firmly engages the inflator, and the flange firmly engages the spacer.

Alternatively, in embodiments in which the spacer is harder than the inflator and the flange, the spacer may simply be pressed into the inflator to form the indentation prior to inclusion of the flange. This may be accomplished through the use of an external press, thermal contraction, or any other known method. The flange may then be assembled onto the spacer and inflator as described above, or by another method. For example, the flange may be created in modular portions and assembled around the spacer/inflator arrangement, or the flange may be heated, positioned around the spacer and inflator, and then allowed to contract and cool.

Such a method of assembly provides numerous advantages over known interference fit operations. Deformation of the inflator is limited to a comparatively narrow, circumferential portion of the inflator. Additionally, in certain embodiments, a comparatively small force must be applied over only a comparatively small distance to bring about secure engagement of the inflator, spacer, and flange. The tapered inside diameter of the flange strongly resists outward motion of the inflator from the vehicle surface because outward motion of the inflator tightens the interference fit.

Additionally, particularly where the spacer is an expandable structure, such as a split ring, the same spacer and flange can be fitted on inflators with different diameters. The tapered interior diameter of the flange permits the flange to be installed over spacers with a range of sizes; the flange simply engages the spacer at a different location within the flange.

These and other advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
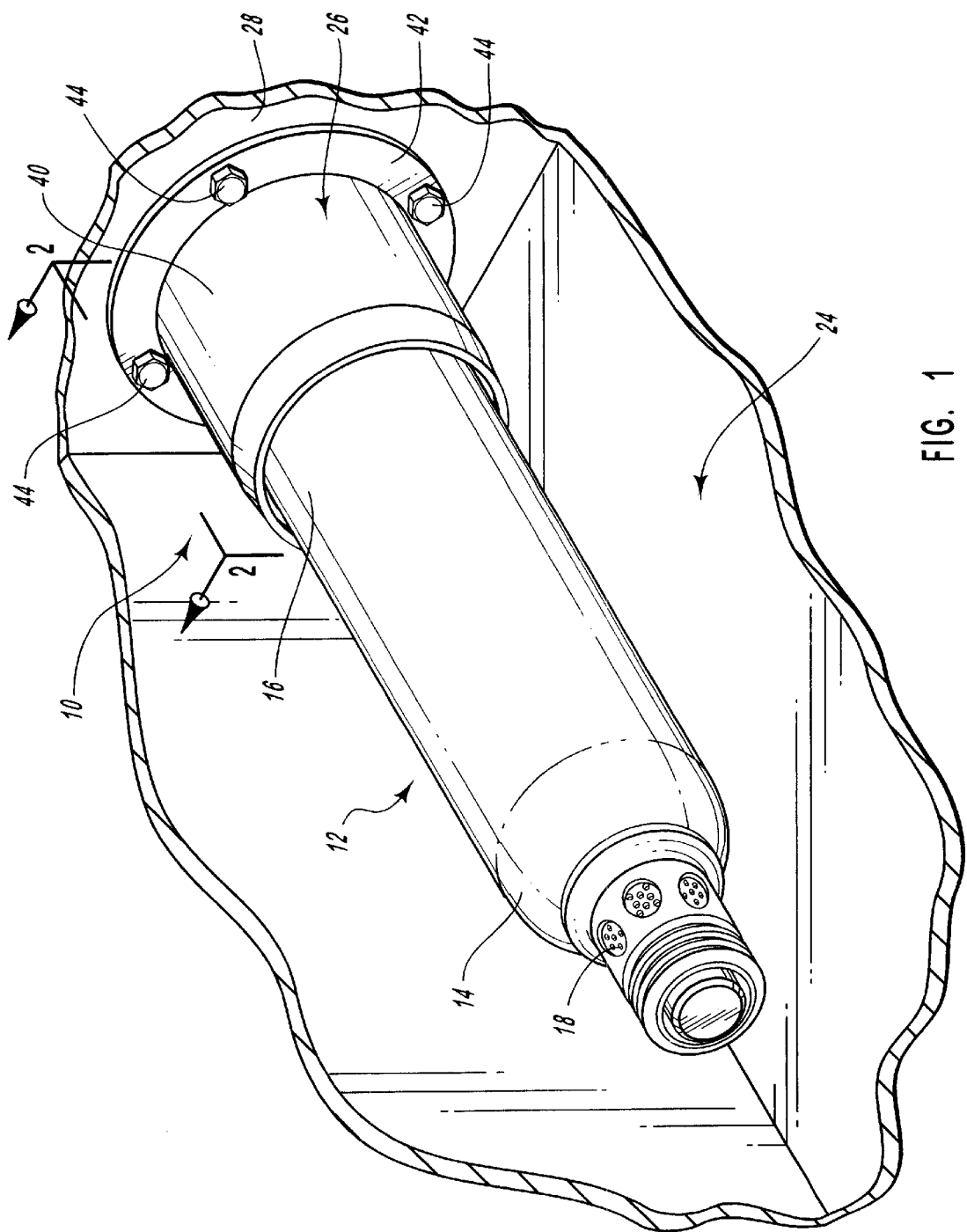
FIG. 1 is a perspective view of one embodiment of an inflator assembly according to the present invention.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

In determining the strength of an interference fit, several factors are relevant. Generally, the retention strength of a fit is the force required to induce slippage between two attached members. The strength of a conventional cylindrical press fit is typically proportional to the frictional coefficient between materials that make up the two members, the contact area between the members, the modulus of elasticity of the two materials, and the amount of interference (i.e., overlap between the parts in their undeformed state). The strength of the fit is also typically inversely proportional to the radius of the interface between the two parts.

In certain applications, the degree to which these factors can be changed to alter the strength of the fit is somewhat limited. For example, when an inflator having a standard shape, size, and material is to be used, there can be little control over the frictional coefficient or the modulus of elasticity because changing these values would require using different materials or property-changing treatments. Increasing the amount of interference between the inflator and its attachment also increases deformation of the inflator, which is undesirable for the reasons mentioned above in relation to pressure vessels. Due to the limited space available, it may also be difficult to increase the contact area between the inflator and its attachment. If the contact area is increased, assembly is made more difficult because the inflator and the attachment must be pressed together over a longer distance.

Additionally, even to the extent that relevant factors can be varied to obtain a sufficient retention strength, conventional press fits require a compressive attachment force that is generally similar to the retention strength. As a general rule, the stronger the retention strength, the more difficult the assembly.

The present invention provides an apparatus and method with which a high strength press fit may be obtained without having to apply a comparatively large attachment force over a large distance. Yet, the interference fit still has a high retention strength. This high strength is obtained, in part, by providing an interference fit in which members are attached and fitted in the same direction for which continued relative motion is to be restrained by the interference fit. Thus, attempts to draw the inflator out from the assembly simply tighten the fitting. In certain embodiments, additional retention strength may be obtained by compressing parts of the assembly tightly enough to indent softer parts, so as to increase the disassembly interference.

These concepts will be described in further detail in the following disclosure. Although the example of an airbag inflator is used in the description and drawings, those skilled in the art will recognize that the apparatus and method described may easily be adapted for attachment of other types of rounded members. A "rounded member" need not be cylindrical, but may have any shape in which a curved surface forms a significant portion of the surface of the member.

Referring to FIG. 1, an inflator assembly 10 is provided for firmly attaching an inflator 12 inside a vehicle. The inflator 12 may be a standard airbag inflator containing an igniter and propellant designed to produce gas to inflate an airbag (not shown). The inflator 12 may thus be a pressure vessel with a substantially cylindrical portion capped by roughly hemispherical end caps. The inflator 12 may have a first end 14 and a second end 16, with an outlet 18 positioned at the first end 14 to provide an escape path for gases leaving the inflator 12. The outlet 18 may be exposed to expel gas directly into an open end of the airbag, or may be connected to the airbag by a suitable conduit (not shown).

The inflator assembly 10 may be installed inside a vehicle compartment 24, such as a compartment in the passenger side of a vehicle. The compartment 24 may be dimensioned to accommodate an airbag folded around the inflator 12, in position for rapid deployment through a cover (not shown) facing the passenger compartment. The inflator 12 may be mounted with an attachment member 26, or flange 26, in a cantilever arrangement with a vehicle surface 28 comprising one wall of the compartment 24. The vehicle surface 28 may be substantially flat, as shown, or may be rounded or otherwise contoured to suit the space available for the compartment 24. Likewise, the flange 26 need not be configured as shown, but may have any geometry that captures the inflator 12, and yet provides a suitable interface with a vehicle surface 28 of the compartment 24 for mounting.

As mentioned previously, the cantilevered attachment is only one possible configuration. According to other attachment methods, the first end 14 may be affixed to a vehicle surface (not shown), in addition to, or in place of, rigid attachment of the flange 26 to the vehicle surface 28. The outlet 18 is depicted with threads that can be used to accomplish such attachment.

The flange 26 may have a shank 40 designed to fit around the inflator 12, preferably with a modest amount of clearance. The shank 40 may thus be tubular in shape, as depicted in FIG. 1, but may also be differently shaped if it is desirable to mount the inflator 12 from an angle different from that depicted in FIG. 1. The shank 40 also need not necessarily comprise a full tubular member, but may have suitable gaps to cut down on material costs, weight, or stiffness. A web 42 is then provided, in substantially perpendicular arrangement with the axis of the shank. The web 42 is preferably shaped to fit the vehicle surface 28; the web 42 may thus be flat. The web 42 is affixed to the vehicle surface 28 by a suitable method, such as fastening, chemical or adhesive bonding, thermal, frictional, vibrational, or radio frequency welding, or the like. Fasteners 44 are depicted in FIG. 1 by way of example.

Figure 2:
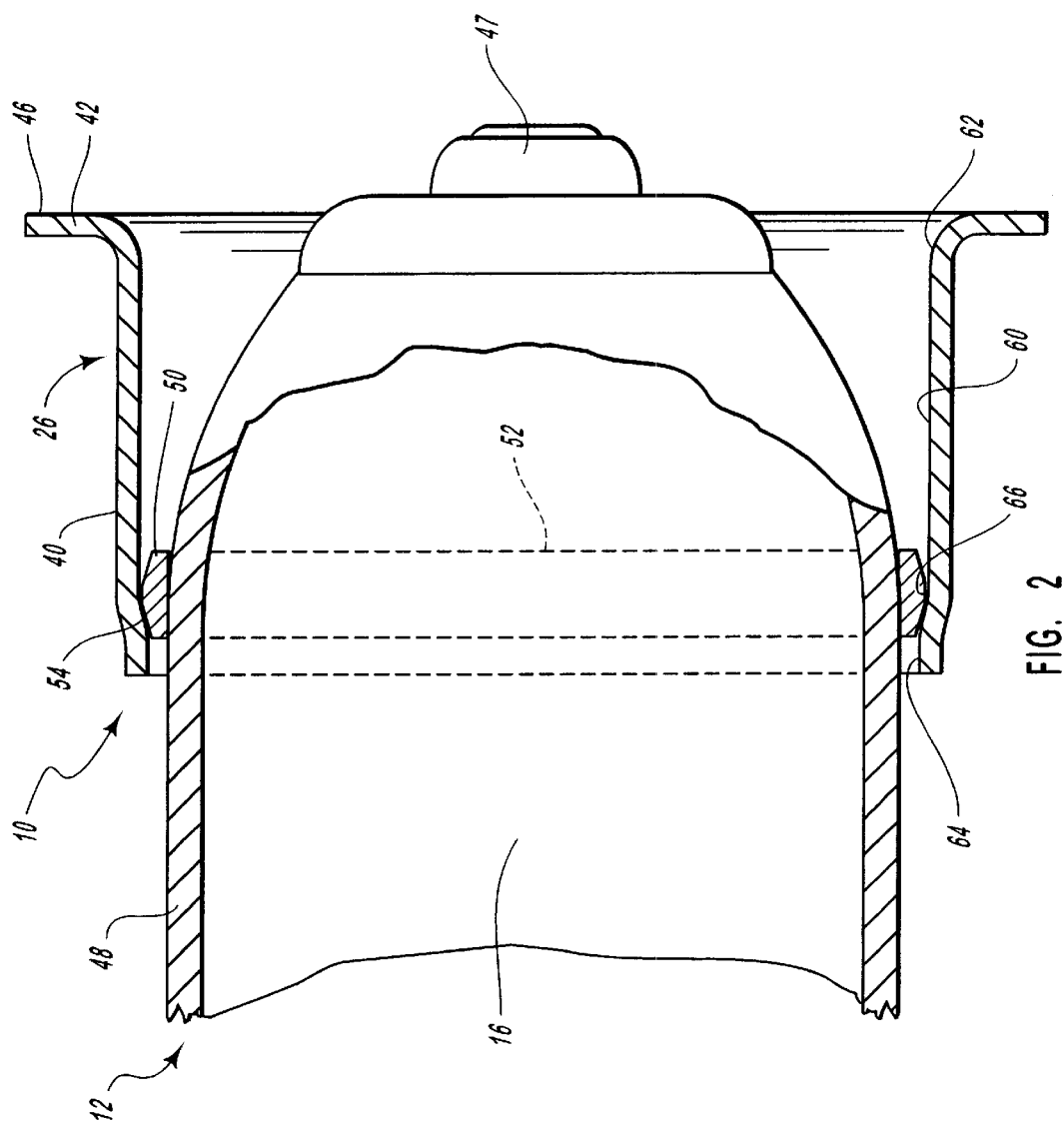
FIG. 2 is a cross-sectioned, side view of the inflator assembly of FIG. 1.

Referring to FIG. 2, a cross section of one possible embodiment of the inflator assembly 10 is depicted. The web 42 may have a mounting surface 46 facing the vehicle surface 28, and shaped to engage the vehicle surface 28. The inflator 12 may have a plateau 47 protruding from the second end 16 of the inflator 12. The plateau 47 may rest against the vehicle surface 28, or may be disposed within a suitable alcove in the vehicle surface 28 when the inflator assembly 12 is affixed within the compartment 24.

The inflator 12 may have an outer membrane 48 designed to contain the pressurized gases inside the inflator 12. The outer membrane 48 is preferably constructed of a comparatively ductile material, such as steel or aluminum. Preferably, the outer membrane 48 is devoid of cracks, holes, or other features that may create stress concentrations, or stress risers, in the outer membrane 48. The outer membrane 48 may be formed around an ignitor and propellant within the inflator 12. Preferably, the outer membrane comprises a substantially uniform thickness.

A spacer 50 may be positioned between the second end 16 of the inflator 12 and the flange 26. Preferably, the flange 26 substantially encircles the spacer 50, or surrounds it to the extent necessary to provide inward pressure. Thus, the flange 26 need not entirely cover or surround the spacer 50. According to certain embodiments, the spacer 50 may have a substantially ring-like shape substantially encircling an attachment surface 52, or circumferential portion 52, of the inflator 12. A substantially ring-like shape need not extend full circle, and need not have a uniform cross section.

Preferably, the attachment surface 52 comprises a cylindrical band, or section, of the inflator 12. However, the attachment surface 52 may comprise any path around the inflator 12. The spacer 50 may comprise a split ring, as shown, that can be expanded to fit with clearance around the inflator 12, or compressed to grip the inflator 12. Alternatively, the spacer 50 may take a number of different forms, depending on the type of loading the inflator 12 will be most subject to.

If the inflator 12 is to bear a comparatively high degree of tension along its axis, the spacer 50 may advantageously comprise a plurality of split rings, so as to provide greater gripping force against axial motion. Alternatively, if a high torsional loading pattern is expected, the spacer 50 may comprise a series of ring sections separated by gaps or smaller connecting portions, or may simply comprise a split or whole ring with a plurality of ridges parallel to the axis of the spacer 50 to grip the inflator 12 and/or the flange 26 for rotational stability.

The spacer 50 may also have a peaked portion 54 configured to provide enhanced gripping reinforcement against axial motion. The flange 26 may have a tapered inside diameter 60 including a larger portion 62 proximate the web 42 and a smaller portion 64 further from the web 42. The tapered inside diameter 60 may thus have a continuously tapering configuration, or may have one or more portions with no taper adjoining tapered portions. In the embodiment depicted in FIG. 2, the peaked portion 54 engages an indentation 66 formed in the tapered inside diameter 60. The indentation 66 may be pre-formed in the tapered inside diameter 60, or may be formed in the course of the assembly process. The indentation 66 provides a comparatively severe interference with the peaked portion 54. In other words, the indentation 60 would have to expand considerably over a comparatively small distance in order to release the peaked portion 54 of the spacer 50.

Figure 3:
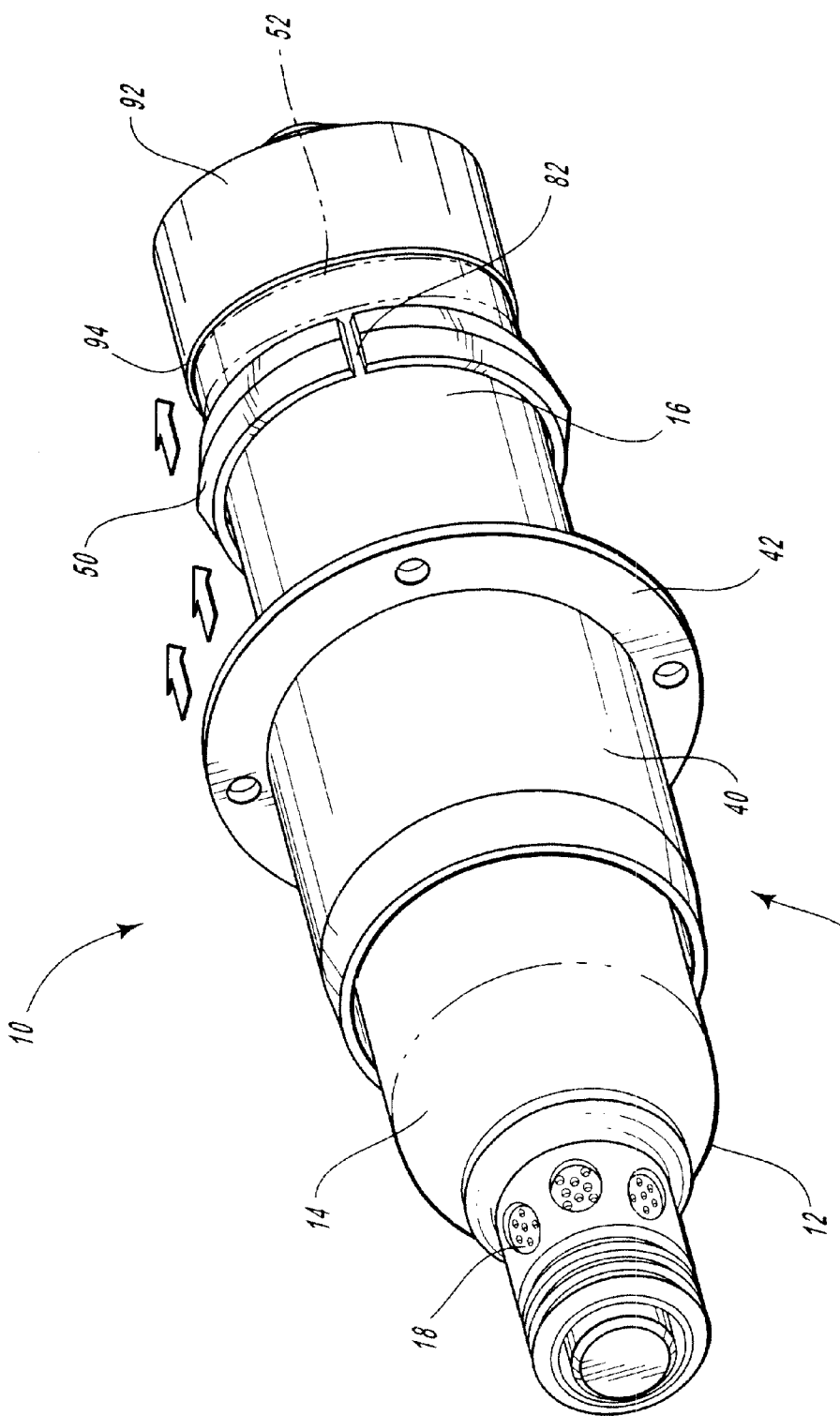
FIG. 3 is a perspective view of a method of assembly suitable for the inflator assembly of FIG. 1.

Referring to FIG. 3, an exploded view of the inflator assembly 10 is depicted, in the process of assembly. One advantage of the inflator assembly 10, and particularly the use of the spacer 50, is that the flange 26 need not be pressed onto the inflator 12 from the second end 16. If the flange 26 were pressed on from the second end 16, in order to obtain a strong interference fit, a high attachment force would have to be applied, because the attachment force is proportional to the retention strength. If the flange 26 were to be drawn over the first end 14 of the inflator 12 and onto the attachment surface 52, without the use of a spacer 50, the flange 26 would have to be dimensioned to interfere with the inflator 12, and would have to be forced with considerable pressure along nearly the entire length of the inflator 12.

The inflator assembly 10 of the present invention overcomes these limitations through the use of the spacer 50 in combination with the flange 26. The spacer 50 may advantageously have a split ring configuration, or a ring with only a comparatively small gap 82. The gap 82 permits the spacer 50 to flex somewhat, so that the spacer 50 is able to slide over the inflator 12, and yet grip the attachment surface 52 once inward pressure is applied against the spacer 50.

A tube-shaped support 92 may then be provided for purposes of assembly. The support 92 is preferably constructed of a comparatively stiff material, such as a metal. The support 92 is then fixed in position with respect to the inflator 12, by a method such as clamping or placing the second end 16 of the inflator 12 and the support 92 against a support plate (not shown). The spacer 50 may thus be slid into position abutting a shoulder 94 of the support 92, so that the support 92 holds the spacer 50 in position over the attachment surface 52.

Preferably, the support 92 is made with an outside diameter small enough to fit within the larger portion 62 of the tapered inside diameter 60 of the flange 26. The support 92 need not be tube-shaped, but may comprise any configuration suitable for holding the spacer 50 in place under pressure. If the spacer 50 does not comprise a ring shape, the shoulder 94 may be shaped to removably abut the spacer 50 to provide the necessary registering force.

When the spacer 50 is in position, the flange 26 may then be inserted around the first end 14 of the inflator 12, as depicted in FIG. 3, and slid toward the attachment surface 52 and the spacer 50. As shown in FIG. 2, the larger and smaller portions 62, 64 of the tapered inside diameter 60 of the flange 26 preferably fit with clearance over the inflator 12. Consequently, the flange 26 may be moved with relative ease over the inflator 12 until the flange 26 reaches the spacer 50. The larger portion 62 of the tapered inside diameter 60 of the flange 26 also preferably fits with clearance over the spacer 50.

Between the larger portion 62 and the smaller portion 64, the tapered inside diameter 60 begins to interfere with the spacer 50. Thus, pressure must be applied to the flange 26 to continue moving the flange 26 over the spacer 50. Pressure may be applied by any suitable means. In certain embodiments, the flange and spacer may be dimensioned so that adequate pressure may be applied by hand to obtain the fully assembled configuration depicted in FIG. 2. Alternatively, the inflator assembly 10 may be fixtured within a press or other machine that applies linear force, so that greater relative pressure may be applied between the flange 26 and the spacer 50, inflator 12, and support 92.

The point at which the tapered inside diameter 60 begins to interfere with the spacer 50 varies somewhat, depending on the size of the inflator 12. If the inflator 12 is comparatively large, the spacer 50 may be expanded to a high degree, so that the gap 82 is comparatively large. In such a case, the inside diameter 60 engages the spacer 50 toward the larger portion 62. Conversely, where the inflator 12 is comparatively small, the spacer 50 need not expand as much, and the inside diameter 60 does not begin to interfere with the spacer 50 until the spacer 50 is positioned further toward the smaller portion 64 of the inside diameter.

In either case, the flange 26 may obtain the proper position relative to the inflator 12 through the application of the appropriate amount of pressure. If desired, differently sized spacers 50 may be used in conjunction with a single size of flange 26 to keep the applied pressure constant between different inflator sizes.

As the portion of the tapered inside diameter 60 in contact with the spacer 50 becomes smaller, more pressure must be applied to draw the flange 26 toward the second end 16 of the inflator, over the support 92. The spacer 50 is pressed inward against the attachment surface 52 by the effective narrowing of the tapered inside diameter 60 of the flange 26. If configured as a split ring, the spacer 50 may accommodate compression by virtue of the gap 82, which may shrink under inward radial pressure against the spacer 50. The sloping shape of the peaked portion 54 of the spacer 50 may help to ensure that no sharp edge of the spacer 50 is able to prematurely dig into any portion of the tapered inside diameter 60 of the flange 26, and thereby arrest the motion of the flange 26 around the spacer 50.

Ultimately, the flange 26 reaches the position depicted in FIG. 2, and pressure need no longer be applied. The flange 26 is under radial tension, and the spacer 50 is radially compressed by the flange 26 against the inflator 12. As a result, the friction between the spacer 50 and the inflator 12 firmly attaches the spacer 50 to the inflator 12, and friction between the spacer 50 and the flange 26 firmly attaches the flange 26 to the spacer 50. Thus, the flange 26 is held firmly in position around the inflator 12 by virtue of the spacer 50, even though the flange 26 is dimensioned to fit around the inflator 12 with clearance.

Figure 4:
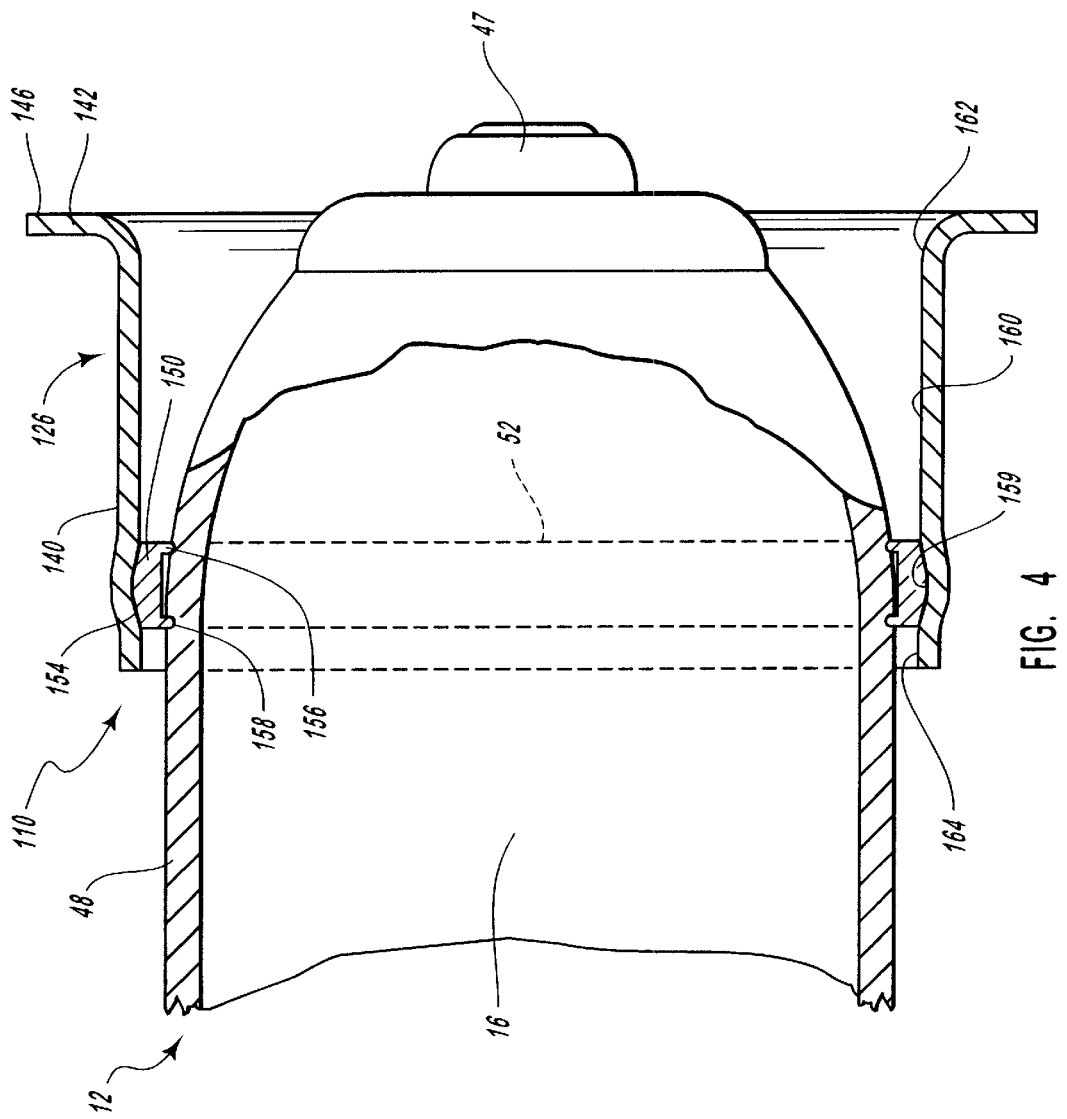
FIG. 4 is a cross-sectioned, side view of an alternative embodiment of the invention.

Referring to FIG. 4, a cross-sectional view of an alternative embodiment of an inflator assembly 110 according to the invention is depicted. The inflator assembly 110 may also comprise a standard inflator 12 like that of FIGS. 1–3. Like the flange 26 depicted in FIG. 2, the flange 126 of the inflator assembly 110 may comprise a shank 140 and a web 142 with a mounting surface 146 configured to interface with the vehicle surface 28.

A spacer 150 may also be provided. However, for this embodiment, the spacer 150 is preferably harder than the inflator 12, the flange 126, or both. The spacer 150 may thus be formed of a harder material, or may be treated through a process such as case hardening, alloying, heating and quenching, or the like. Thus, the spacer 150 may be configured to create a somewhat more severe indentation in the inflator 12 or the flange 126, or both.

As depicted, the spacer 150 has a peaked portion 154, which may be similar in configuration to the peaked portion 54 depicted in FIG. 2. Alternatively, the peaked portion 154 may be somewhat truncated so as to avoid creating a stress-concentrated, point loading condition in the shank 140 of the flange 126. The spacer 150 may also have one or more ridges 156 interiorly formed on the spacer 150. The effect of the ridges 156 and the peaked portion 154 is to create somewhat severe indentations 158, 159 in the inflator 12 and the shank 140 of the flange 126, respectively. These indentations 158, 159 provide additional resistance against axial relative motion of the inflator 12, spacer 150, and flange 126.

As with the spacer 50, additional features may be used in addition to or in place of the peaked portion 154 and the ridges 156. For example, ridges may be added in the direction of the axis of symmetry of the inflator 12 to shape the indentations 158, 159 for support against relative rotation of the inflator 12, spacer 150, and flange 126 in response to torsional force. As with the spacer 50, the spacer 150 may also comprise multiple rings or ring sections, depending on whether additional resistance is needed to axial or torsional force.

The inflator assembly 110 may be assembled in the same manner described in connection with FIG. 3, if desired. Thus, the flange 126 may be formed with a tapered inside diameter 160, with a larger portion 162 and a smaller portion 164. The flange 126 may then be pressed over the spacer 150 and support 92 to push the spacer 150 into engagement with the inflator 12, thereby forming the indentation 158.

In the alternative, the spacer 150 may be pressed into the inflator 12 prior to installation of the flange 126. This may be performed by simply applying radial pressure inward against the spacer 150 with a machine press or other tool configured to apply the appropriate pressure. The process depicted in FIG. 3 may then be performed to attach the flange 126 to the spacer 150. If the spacer 150 has already been pressed into position, it may be unnecessary to use the support 92 to keep the spacer 150 in place during installation of the flange 126.

However, if the spacer 150 is already pressed into the inflator 12, the method depicted in FIG. 3 need not be used to attach the flange 126. The flange 126 may, for example, be heated into expansion to fit over the spacer 150 with clearance, and then permitted to cool and contract. Alternatively, the flange 126 may be made large enough to fit over the installed and compressed spacer 150 with clearance, and may be externally pressed inward to engage the spacer 150 by a method such as that used to press the spacer 150 into engagement with the inflator 12.

As with the embodiment of FIGS. 1 through 3, the inflator assembly 110 may include a range of different inflator sizes, without necessarily requiring the use of a different flange 126 and/or spacer 150. Thus, the inflator assembly 110 may provide cost and installation time advantages over previously known methods.

Consequently, the present invention provides an apparatus and method whereby a rounded member may be tightly attached to resist axial and torsional forces. The geometry of the spacer 50 or 150, and the associated indentations 66 or 158, 159 provide a more severe interference to prevent rotational or linear slippage of the inflator 12 from its mounting. Additionally, the method of assembly disclosed by the present invention permits a considerable amount of radial pressure to be applied to further strengthen the interference fit. Furthermore, in certain embodiments, the attachment assemblies may be used with different inflator sizes, with a minimal required change of attachment hardware, thereby making inflator installation generally faster and less expensive.

Through the method disclosed, disassembly of the inflator assembly 10 or 110 may not be carried out by reversing the process steps used to assemble the inflator assembly 10 or 110. Thus, in certain embodiments, a high retention strength may be obtained without applying a similarly high assembly force. Additionally, the flange 26 or 126 and spacer 50 or 150 may be easily and inexpensively manufactured. No welded joints are present, so regulations concerning welded joints in vehicles need not be dealt with.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflator assembly for an airbag apparatus, the inflator assembly comprising:
    an inflator having a circumferential portion;
    a spacer configured to be tightly engageable to the circumferential portion of the inflator; and
    a flange configured to substantially encircle the spacer, wherein the flange is dimensioned to press the spacer against the inflator and to provide an interference fit with the spacer.

2. The inflator assembly of claim 1, wherein the inflator comprises a substantially cylindrical portion comprising the circumferential portion.

3. The inflator assembly of claim 2, wherein the spacer comprises a substantially circular shape configured to substantially encircle the circumferential portion.

4. The inflator assembly of claim 3, wherein the spacer comprises a split ring.

5. The inflator assembly of claim 4, wherein the flange comprises a mounting surface oriented perpendicular to an axis of symmetry of the substantially cylindrical portion of the inflator, wherein the mounting surface is adapted to be affixed to a substantially flat surface.

6. The inflator assembly of claim 5, wherein the flange comprises a tapered inside diameter.

7. The inflator assembly of claim 6, wherein a larger portion of the inside diameter is dimensioned to provide a clearance fit around the spacer when the spacer is disposed around the circumferential portion of the inflator, and wherein a smaller portion of the inside diameter is dimensioned to provide an interference fit around the spacer when the spacer is disposed around the circumferential portion of the inflator, such that axial translation of the flange around the spacer and the inflator gradually presses the spacer against the inflator.

8. The inflator assembly of claim 1, wherein the spacer is harder than the inflator.

9. The inflator assembly of claim 8, wherein the spacer comprises a ridge interiorly formed on the spacer, wherein the ridge is configured to deform the inflator so as to prevent linear motion of the spacer with respect to the inflator.

10. An inflator assembly for an airbag apparatus, the inflator assembly comprising:
    an inflator comprising an outer membrane configured to restrain a quantity of pressurized gas, the outer membrane comprising an attachment surface disposed substantially about a circumferential portion of the outer membrane;
    a spacer configured to substantially encircle the attachment surface; and
    a flange configured to substantially encircle the spacer, wherein the flange is sized to exert inward pressure creating an interference fit between the spacer and the attachment surface.

11. The inflator assembly of claim 10, wherein the outer membrane comprises a substantially cylindrical shape, and wherein the attachment surface comprises a cylindrical band of the cylindrical shape.

12. The inflator assembly of claim 11, wherein the spacer comprises a split ring.

13. The inflator assembly of claim 12, wherein the flange comprises a tapered inside diameter configured to be movable in an axial direction with respect to the spacer to tighten the spacer against the inflator.

14. The inflator assembly of claim 10, wherein the flange comprises a shank encircling the spacer and a web extending outward from the shank, the web having a plurality of fasteners configured to affix the flange to a vehicle surface.

15. The inflator assembly of claim 10, wherein the inflator further comprises a first end and a second end, the attachment surface being disposed toward the second end, the first end having threads configured to attach the first end to a vehicle surface.

16. The inflator assembly of claim 10, wherein the spacer is further configured to expand to accommodate inflators with different diameters.

17. A method for attaching a flange to an inflator for an airbag apparatus, the method comprising:
    providing an inflator, a spacer, and a flange;
    positioning the spacer around a portion of the inflator; and
    inducing frictional engagement between the spacer and the portion of the inflator by
    positioning an inside diameter of the flange around the spacer so as to frictionally engage the spacer such that inward pressure creates an interference fit between the spacer and the inflator.

18. The method of claim 17, wherein the spacer is harder than the inflator.

19. The method of claim 17, wherein the flange comprises a tapered inside diameter, and wherein inducing frictional engagement between the spacer and the portion of the inflator comprises:
    positioning a larger portion of the tapered inside diameter of the flange around the spacer; and
    exerting relative pressure in an axial direction between the flange and the spacer to force a smaller portion of the tapered inside diameter of the flange to substantially encircle the spacer, such that the flange presses the spacer inward against the inflator.

20. The method of claim 19, further comprising:
    providing a support configured to restrain axial motion of the spacer; and
    positioning the support in abutting relation to the spacer to restrict motion of the spacer in a direction urged by the relative pressure.

21. The method of claim 17, wherein the spacer comprises a split ring.

22. A method for mounting an inflator for an airbag apparatus to a vehicle surface, the method comprising:

provlding an inflator, a spacer, and a flange, the flange comprising a mounting surface, wherein the flange is configured to substantially encircle a portion of the inflator;

positioning the flange and spacer such that the flange presses the spacer inward against the inflator such that the inward pressure creates an interference fit between the spacer and the inflator; and abutting the mounting surface against the vehicle surface.

23. The method of claim 22, wherein the flange comprises a tapered inside diameter, and wherein positioning the flange and spacer comprises:

positioning the spacer around the inflator;

positioning a larger portion of the inside diameter of the flange around the spacer; and moving the flange in an axial direction with respect to the inflator and spacer so as to position a smaller portion of the inside diameter of the flange around the spacer, the smaller portion being dimensioned to interfere with the spacer so as to press the spacer inward against the inflator.

24. The method of claim 23, further comprising:

providing a support; and positioning the support to restrain axial motion of the spacer while the smaller portion of the inside diameter of the flange is moved into interference with the spacer.

25. The method of claim 22, further comprising:

providing a plurality of fasteners; and affixing the mounting surface to the vehicle surface with the fasteners.

26. The method of claim 22, wherein the inflator further comprises a first end and a second end, wherein positioning the flange and spacer further comprises positioning the flange and spacer proximate the second end, the method further comprising:

forming threads in the first end of the inflator; and affixing the first end to a vehicle surface using the threads.

* * * * *